April 8, 1958 G. RATTI 2,829,558
SPECTACLE FRAMES
Filed Dec. 18, 1953
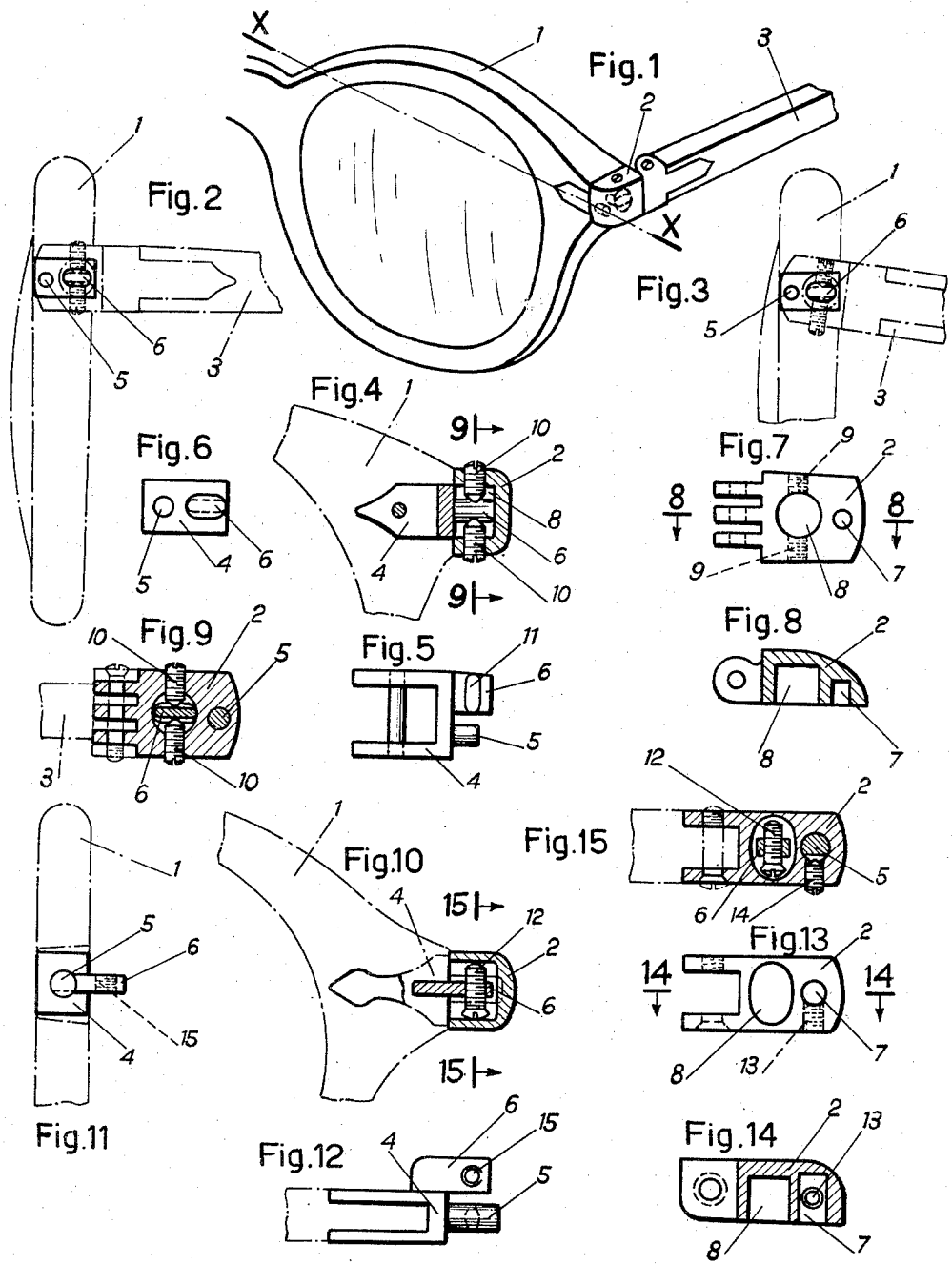
INVENTOR
GIUSEPPI RATTI
By: Young, Emery &
Thompson
Attys.

United States Patent Office

2,829,558
Patented Apr. 8, 1958

2,829,558

SPECTACLE FRAMES

Giuseppe Ratti, Turin, Italy

Application December 18, 1953, Serial No. 399,141

Claims priority, application Italy December 20, 1952

2 Claims. (Cl. 88—53)

This invention relates to the spectacles in which the ear bars or temples are connected with the ends of the frontal frame, in such a manner that it is possible to give easily to the spectacle frame a more or less inclined position about a transverse axis leading through the points of articulation of the two ear bars to the spectacle frame.

It is thus made possible to fit the whole spectacle to the configuration of the bearer's face, so that the spectacle frame or the lenses, or the like are placed in the correct position before the bearer's eyes.

To this end, according to this invention, the hinge which serves for connecting each ear bar to the spectacle frame is connected with the spectacle frame by means of a joint which comprises a pivot, lying on a transverse axis between the two ear bars, and an adjustable abutment in displaced relation to said pivot and by means of which the ear bars may be secured in the desired angular position.

In particular, the joint comprises a member which carries the pivot and/or the abutment and a member comprising the seat for the pivot and/or the cavity where the abutment is located. One of these members is fixed to the spectacle frame, while the other is applied, or formed, on the hinge carried by the ear bar.

Two embodiments of the spectacle frame according to the invention are shown by way of example in the annexed drawing, in which Figure 1 shows diagrammatically a perspective view of the frame and ear bars;

Figures 2 and 3 show the frame in lateral view with the ear bar in two different angular positions;

Figure 4 is a section, made in the plane of the spectacle frame, of the joint according to a first embodiment;

Figure 5 is a plan view of the part of the joint fixed to the spectacle frame;

Figure 6 is a lateral view thereof;

Figure 7 is a lateral view of the hinge element that forms the other member of the joint;

Figure 8 is a section along 8—8 in Figure 7;

Figure 9 is a section along 9—9 in Figure 4;

Figure 10 is a section, in a plan parallel to the spectacle frame, of a joint according to a second embodiment;

Figure 11 is a lateral view of the joint member fixed to the spectacle frame;

Figure 12 is a plan view;

Figures 13 and 14 are respectively a lateral view and a section along 14—14 in Figure 13, of the hinge which forms the second member of the joint, and Figure 15 is a sectional along 15—15 in Figure 10.

Referring to the Figure 1, there is shown diagrammatically in perspective the arrangement according to the invention with the frame 1 adapted to be inclined about the axis x—x through an articulated joint, not shown in this figure, by means of which the hinge 2 of the ear bar 3 is united with the frame 1.

Figures 2 and 3 show, also diagrammatically, and in lateral view, the ear bar 3 in two different angular positions relative to frame 1. In these figures the joint is seen which connects the hinge 2 with the frame 1 and is shown in detail in Figures 4 to 9.

The joint according to this example comprises a member 4 fixed to the frame 1 and carrying the pivot 5 and an abutting tongue 6. The other member of the joint is formed by the hinge 2 fixed to the ear bar 3 and having a seat 7 for the pivot 5 as well as a cavity 8 in which the tongue 6 is located. The cavity 8 has two diametrally opposed screwthreaded holes 9 adapted to receive the screws 10, whose points, in the mounted condition of the joint, engage into notches 11 provided on the two faces of the tongue 6.

By means of the described arrangement, the angular position of the hinge 2, and respectively of the ear bar 3, to which said hinge is fixed, relative to the frame, depends upon the position of the two screws 10 in the holes 9.

Therefore, in order to adjust the inclination of the spectacle frame it is only required to slacken the two screws 10 so that the abutting tongue 6 may acquire a certain freedom of movement in the cavity 8, and the hinge 2, and respectively the ear bar 3, may be angularly displaced about the pivot 5. After bringing the ear bar in the desired angular position in respect to the frame, e. g. in the position shown in Figure 3, the screws 10 are again tightened, which thereby lock the joint and secure the ear bar in the selected position. Or alternately, according to the sense of deviation desired, one of the screws 10 is unscrewed to a certain extent while the other is screwed on in proportion, with the result of the ear bar shifting angularly.

In the example shown in Figures 10 and 11 the member 4 of the joint carrying the pivot 5 and the tongue 6 is fixed to the spectacle frame, and the other member is formed by the hinge 2 in which is provided the seat 7 for the pivot 5 and the cavity 8 in which takes place the tongue 6. However, in this case, the cavity has no holes and the tongue has a screwthreaded hole 15 adapted to receive a screw 12 that abuts against the walls of the cavity 8 and whose position in the hole 15 consequently determines the inclination of the ear bar relatively to the frame. Into the seat 7 for the pivot opens a screw-threaded hole 13 for a pressure screw 14 which, acting upon the pivot 5, secures the ear bar in the elected angular position and prevents the separation of the ear bar from the spectacle frame.

To adjust the inclination, the pressure screw 14 is unscrewed, thereby disengaging the ear bar which may thus be sepaarted from the spectacle frame. Hereupon the position of the screw 12 is adjusted to the direction required by screwing it more or less into the tongue 6, the ear bar is again fitted up taking now the position determined by the abutment of the screw 12 against the walls of the cavity 8, and the ear bar is locked in its new position by the screw 14.

The described embodiments admit of course many constructive variants without thereby departing from the scope of this invention. In particular, the pivot, the stopping means and the respective cavity may be distributed between the two members of the joint in a manner different from that shown in the figures. Thus, e. g., the pivot of the joint (and/or the abutting tongue) may be fitted to the member carried by the hinge instead of to the member fixed to the spectacle frame. In that case, the seat for the pivot (and/or the cavity where the tongue is located) is provided in the member fixed to the spectacle frame.

What I claim is:

1. Spectacle frame with ear bars connected for variable inclined position, a hinge for the connection of each ear bar with the frame, a pivot carried by one of said hinge and frame members for pivotal connection between said hinge member and said frame member around a transverse axis lying in the plane of said frame member, a seat for said pivot carried by the other of said hinge and frame members, cooperating abutting means independent of and displaced with respect to said pivot and serving to secure each ear bar in the desired inclined position, said abutting means comprising a screw-bored tongue carried by one of said hinge and frame members, a hole in the other of said hinge and frame members for receiving said tongue and an adjustable screw screwed in said tongue and adapted to abut against the walls of said hole.

2. In a spectacle frame according to claim 1, a screw screwed in a bore of the member carrying said seat for said pivot and adapted to bear against said pivot.

References Cited in the file of this patent

UNITED STATES PATENTS

| | | |
|---|---|---|
| 1,932,482 | Rigler | Oct. 31, 1933 |
| 2,256,491 | Peck et al. | Sept. 23, 1941 |
| 2,386,012 | Street | Oct. 2, 1945 |
| 2,628,531 | Wright | Feb. 17, 1953 |

FOREIGN PATENTS

| | | |
|---|---|---|
| 9,202 | Great Britain | of 1885 |
| 407,887 | Great Britain | Mar. 29, 1934 |
| 419,466 | Great Britain | Nov. 13, 1934 |
| 315,865 | Italy | Mar. 9, 1934 |